(12) United States Patent
Klug et al.

(10) Patent No.: US 6,368,525 B1
(45) Date of Patent: Apr. 9, 2002

(54) METHOD FOR REMOVING VOLATILE COMPONENTS FROM A CERAMIC ARTICLE, AND RELATED PROCESSES

(75) Inventors: Frederic Joseph Klug, Schenectady; Sylvia Marie DeCarr, Waterford, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/499,121

(22) Filed: Feb. 7, 2000

(51) Int. Cl.[7] .................................................. B05B 3/00
(52) U.S. Cl. ...................... 264/28; 264/645; 264/648; 264/650; 264/669; 264/670
(58) Field of Search .......................... 264/28, 669, 670, 264/645, 650, 648

(56) References Cited

U.S. PATENT DOCUMENTS

| | | | |
|---|---|---|---|
| 2,893,102 A | * 7/1959 | Maxwell et al. ............... | 264/28 |
| 4,965,027 A | * 10/1990 | Takahashi ..................... | 264/28 |
| 5,028,362 A | * 7/1991 | Janney et al. ................ | 264/109 |
| 5,047,181 A | * 9/1991 | Occhionero et al. .......... | 264/28 |
| 5,126,082 A | * 6/1992 | Frank ........................... | 264/28 |
| 5,628,938 A | 5/1997 | Sangeeta et al. | |
| 5,660,877 A | 8/1997 | Venkataramani et al. | |
| 5,908,587 A | 6/1999 | Gross et al. | |
| 6,152,211 A | * 11/2000 | Klug et al. ................... | 164/518 |
| 6,228,299 B1 | * 5/2001 | Janney et al. ................ | 264/670 |

OTHER PUBLICATIONS

Patent Abstract—D. Zirbus—DE 19741065.
Patent Abstract—NGK Insulators LTD—JP 09165254.
Patent Abstracts—Kagaku Gijutsucho Mukizaishitsu—JP 09132476.
Patent Abstract—Kagaku Gijutsucho—JP 09132475.
Patent Abstract—E. Galle et al.—EP 593972.
Patent Abstracts—Nippon Telegraph & Telephone Corp.—JP 05051279.
Patent Abstract—Ibiden Co. Ltd.—JP 01192765.
Patent Abstract—Mitsubishi Corp.—EP 161494.

* cited by examiner

*Primary Examiner*—James Derrington
(74) *Attorney, Agent, or Firm*—Robert P. Santandrea; Noreen C. Johnson

(57) ABSTRACT

A method of removing substantially all of the volatile component in a green, volatile-containing ceramic article is disclosed. The method comprises freezing the ceramic article; and then subjecting the frozen article to a vacuum for a sufficient time to freeze-dry the article. Frequently, the article is heated while being freeze-dried. Use of this method efficiently reduces the propensity for any warpage of the article. The article is often formed from a ceramic slurry in a gel-casting process. A method for fabricating a ceramic core used in investment casting is also described.

11 Claims, 1 Drawing Sheet

METHOD FOR REMOVING VOLATILE COMPONENTS FROM A CERAMIC ARTICLE, AND RELATED PROCESSES

The U.S. Government may have certain rights in this invention pursuant to contract number DEAC 05-96OR22464, awarded by the U.S. Department of Energy.

BACKGROUND OF THE INVENTION

This invention relates generally to ceramic articles. More specifically, it relates to methods for successfully drying ceramic articles which have been prepared by techniques which introduce liquids into the articles, e.g., gel-casting techniques.

Ceramic articles are often prepared by techniques which involve the use of liquids, such as water. As an example, an article can be prepared from a ceramic slurry which contains the ceramic component itself (e.g., alumina), along with an aqueous or aqueous/organic solution of a polymerizable binder. The slurry is formed into a green product of a desired shape, and then heated. The heating step vaporizes the liquid in the solution, and polymerizes the binder. Continued heating (typically at temperatures of about 300–1350° C.) vaporizes or "burns off" the binder itself. The green product is then sintered into a final article.

One particular process of this type is referred to as "ceramic gel-casting". In such a process, a ceramic slurry containing a solvent and one or more appropriate monomers is poured into a tool. The slurry is then "gelled" through a catalyzed reaction which polymerizes the monomer, resulting in a rigid solid (sometimes referred to as a polymer-solvent gel matrix). The polymerized component and solvent are easily removed by heating. Thus, the gel-casting of ceramic materials is a very useful process for fabricating complex shapes, e.g., tubing, rings, pipes, sleeves, high-temperature light fixtures, and various turbine engine components. Such materials often have critical advantages in many applications. For example, they can withstand much higher temperatures than molded plastics, and are much more resistant to corrosion than many metals.

While the removal of liquids from green ceramic articles can be carried out quickly, serious problems can sometimes occur. Drying procedures can result in shrinkage and warpage of the article, as capillary forces draw the ceramic particles together. Green parts containing high levels of liquids often exhibit the most shrinkage. Moreover, parts which include both thin cross-sections and thicker cross-sections are very susceptible to cracking or distortion, as the thin sections dry faster than the thicker sections.

Various techniques have been used to minimize these problems. For example, drying the part very slowly in a relative humidity chamber for a period of time can slow down the evaporation rate. Migration of the liquid in the part from interior regions to the surface occurs. As drying progresses, the temperature of the part can be gradually raised while the humidity is gradually lowered, so that evaporation and migration rates remain somewhat reasonable. As another aid, the part can be rested on special supports during the drying process, to minimize distortion.

Nevertheless, additional advances in removing volatile liquids from green ceramic parts are necessary. Slowing down the drying times does not always prevent shrinkage or warpage. Furthermore, increased drying times may greatly decrease the overall efficiency of the ceramic fabrication process.

The problem is especially severe in the case of a part which requires precise dimensions, and which may include many different cross-sectional dimensions throughout its volume. As an example, ceramic cores which are used to define hollow regions in metal castings are often made by the slurry process. The cores must be manufactured to dimensional precision, corresponding to the dimensions of the desired metal casting. Improved techniques associated with making such cores (as well as other slurry-derived components) would be welcome in the art.

SUMMARY OF THE INVENTION

A primary embodiment of this invention is directed to a method of removing substantially all of the volatile component in a green, volatile-containing ceramic article. The method comprises these steps:

(a) freezing the ceramic article; and (b) subjecting the frozen article to a vacuum for a sufficient time to freeze-dry the article.

The volatile component in the ceramic article often (but not always) includes water. As described below, the type of individual volatile component depends in part on how the ceramic article is prepared. For example, an article formed from a gel-casting slurry may include water, an alcohol such as tert-butyl alcohol, and the ceramic components, e.g., alumina and aluminum.

Freeze-drying of the article usually takes place in a freeze-dryer, under as low a vacuum as possible. In preferred embodiments, the article is heated while being freeze-dried, up to a temperature of at least about 20° C.

The ceramic article can be formed from a variety of techniques, such as extrusion, injection molding, or casting. As described below, gel-casting is often the preferred technique. While many ceramic articles can be prepared by this method, cores used in investment casting are often of primary interest. Thus, another embodiment of this invention relates to a method for fabricating a ceramic article suitable for use as a core in the investment casting of directionally solidified and/or single crystal superalloy materials.

As described in the disclosure which follows, use of this invention to remove the volatile component in ceramic articles results in products which do not exhibit any significant warpage upon drying. Moreover, the articles exhibit improved shrinkage-reproducibility. These attributes are especially important when components which require precise dimensions are being formed. Moreover, the relative speed of the process in drying a component can greatly enhance the efficiency of a ceramic fabrication process.

DETAILED DESCRIPTION OF THE INVENTION

Figure 1:
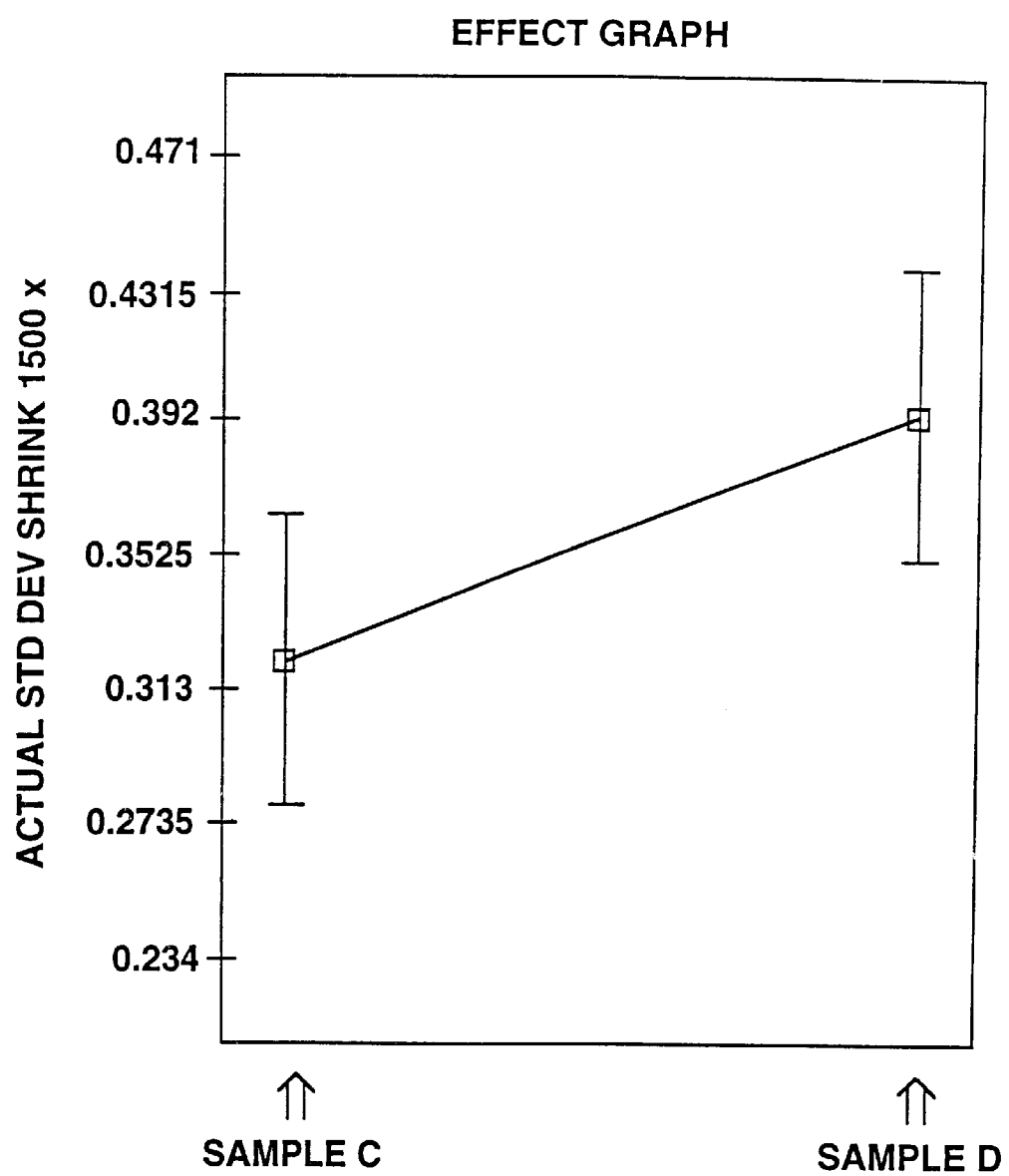
FIG. 1 is a graph depicting shrinkage reproducibility for several samples described in the examples.

Green ceramic articles which are the subject of this invention may contain a variety of volatile components ("volatiles"), depending on how the green body is formed. Usually (but not always), at least a portion of the volatiles is water. As used herein, "volatile component" or "volatiles" is a term which usually embraces water and other components which have boiling points of about 100° C. or lower, and which do not polymerize or cross-link upon heating. The ceramic slurries mentioned earlier may contain, in whole or in part, a variety of volatile organic solutions. An "organic solution" is further defined as any organic-containing liquid that substantially dissolves the monomer used as the binder in the ceramic slurry. The volatile components which are used in the slurries should have a freezing point of greater than about −40° C., and preferably, greater than about −30° C. (Those skilled in the art understand that mixtures of the volatile components should also have freezing points as described above. The freezing point of a particular mixture can be determined experimentally without undue effort).

Suitable, non-limiting examples of volatile components which may be used in the slurries are: water, cyclohexane, tert-butyl alcohol, and mixtures thereof. In preferred embodiments, the slurry comprises at least about 30% by volume of at least one of the above components. It should be understood that other components in the slurry may be "volatile" at elevated temperatures, but are not usually removed until the green body is fired. For example, the polymerized binders are usually removed by volatilization or decomposition during firing.

In removing the volatile components according to this invention, the green ceramic article is first frozen. Any freezing apparatus should be suitable for freezing the article. A freeze dryer is often used, since this type of equipment is usually employed in the subsequent step described below. In the case of gel-casting slurries used in this invention, the freezing point of the gel is often in the range of about −5° C. to about −30° C., and most frequently, in the range of about −10° C. to about −25° C. In some preferred embodiments, the ceramic article is brought down to a temperature at least about 5 to about 10 degrees Centigrade below its predicted freezing point. This ensures complete freezing of the material, e.g., in the case of compositions which tend to supercool, or which contain individual constituents which may not readily freeze at the same rate as the other constituents.

The frozen article is then subjected to a vacuum for a sufficient time to freeze-dry the article. Commercial freeze dryers may be used for this step. Illustrative information regarding freeze-drying can be found in U.S. Pat. No. 5,908,587 (K. Gross et al), and in the Kirk-Othmer *Encyclopedia of Chemical Technology*, 4th Edition, Vol. 8, pp. 475–476 (1993). Both of these sources are incorporated herein by reference.

The strength of the vacuum in the freeze dryer may vary, but is usually in the range of about 50 mtorr to about 500 mtorr. Freeze-drying time will depend on various factors, such as the size of the article; the concentration and type of volatiles contained therein; the concentration and type of other components in the article, e.g., binders and plasticizers; the strength of the vacuum applied; and the optional use of any additional drying steps, as described below. Very often, freeze-drying will take about 2 to about 60 hours at a vacuum of about 300 mtorr or less. Shorter drying times within these ranges are possible as the temperature of the green article is raised, as described below. In the case of gel-casting slurries which comprise alumina, a polymerized binder, and about 35% by about 55% by volume water, freeze-drying will usually be carried out for about 8 hours to about 48 hours.

In some embodiments, the temperature of the ceramic article is raised while in the vacuum. As an example, the temperature may be increased from a minimum, e.g., about 10° C. below the freezing point, to at least the freezing point of the liquid. The temperature can in fact be increased to a level of at least about 20° C., and preferably, at least about 35° C. The temperature is preferably raised gradually, e.g., about 2° C. to about 6° C. per hour. Raising the temperature often increases the rate at which the volatile components are removed from the article. Since the vacuum is maintained, the volatile components sublime. The article itself remains frozen (i.e., it does not "melt"). The article is therefore not subject to warping, and it exhibits improved shrinkage-reproducibility.

In some embodiments of this invention, the green ceramic article is dried for a period of time under conditions of high humidity, prior to being frozen and freeze-dried. This "pre-freeze-drying" step removes a portion of the volatiles, prior to the stage at which any warpage would occur. This step is conveniently carried out in a relative humidity chamber, and the humidity level is usually in the range of about 80% to about 95%. This drying step is usually carried out for a period of time sufficient to remove at least about 2 wt % to about 5 wt % of the volatiles in the green article, based on the total weight of the volatiles. For a green article cast from a slurry containing about 50 volume % liquid (including liquid binders), this drying period is usually in the range of about 8 hours to about 12 hours. Higher humidity levels (within the range described above) tend to increase the drying time, while lower humidity levels decrease the drying time.

As alluded to earlier, the green ceramic articles described herein can be made from many processes. As an example, they can be prepared from a variety of plastic forming techniques, as described in Kirk-Othmer's *Encyclopedia of Chemical Technology*, 4th Edition, Vol. 5, p. 603 et seq. (1993). Examples of the plastic-forming processes are extrusion and injection molding, e.g., powder injection molding (PIM). The articles can also be prepared from paste-forming and slurry-forming operations. The slurries are also used in many ceramic casting operations. Most of these operations utilize water, organic solvents, or other volatile components to enhance the plasticizing characteristics of the ceramic material. As described above, removal of these volatiles after the ceramic article has been formed is a key embodiment of this invention.

Use of the various casting processes is sometimes preferred for this invention. Examples include slip casting, gel casting, and tape casting. Other types of specialty casting operations can also be used in various embodiments, e.g., thixotropic casting.

Gel-casting operations are particularly preferred for some embodiments of this invention. Gel-casting can be used to efficiently manufacture ceramic cores which are, in turn, used to form complex shapes. As an illustration, the shape may be in the form of cooling channels within a shell-molded turbine engine blade. Gel-casting is known in the art and described, for example, in U.S. Pat. Nos. 5,824,250 and 5,772,953; and in U.S. patent application Ser. No. 09/224, 164 (R. Klug et al), filed on Dec. 31, 1998. Each of these documents is incorporated herein by reference. Gel-casting is also described in technical articles, such as: J. Amer. Ceram. Soc. 74(3) 612–18 (1991); Ceramic Bulletin 70(10) 1641–1649 (1991); and "Forming of Silicon Nitride by Gel-casting", Soc. Automotive Engineers, Proc. Annual Automotive Technology Development Contractors Coordination Meeting; pp. 243 and 245–251, 1991.

One example of a gel-casting process involves the casting of an article from a concentrated aqueous suspension of a ceramic powder in a solution of a polymerizable monomer (i.e., a binder). A green solid with good handling strength results after polymerization. The selection of the ceramic component will depend on the type of article being prepared. The ceramic component is usually selected from the group consisting of alumina, alumina-aluminum, silica, zirconia, zircon, silica-zircon, silicon carbide, silicon nitride, magnesium oxide, and mixtures which include one or more of any of these components. The mixtures sometimes include minor amounts (e.g., less than about 2% by weight) of one or more other components, e.g., those conventionally used to modify chemical reactivity or crystallinity. Non-limiting examples include yttrium-, hafnium-, sodium-, or potassium-based compounds.

In some preferred embodiments directed to the preparation of cores for shell molds, the ceramic material is usually selected from the group consisting of silica, alumina, aluminum-alumina (i.e., mixtures of the two); zircon, and mixtures which comprise one or more of any of these components. Most often, the slurry comprises silica, or a mixture of alumina and aluminum. The alumina is preferably fused alumina, and the ratio of alumina to aluminum in the mixture is usually in the range of about 20:1 to about 5:2. As described in the above-referenced application Ser. No. 09/224,164, other compounds may be present in the ceramic slurry, such as yttrium, hafnium, yttrium aluminate, rare earth aluminates; colloidal silica, magnesium, and zirconium.

Various monomers may be used as the binder component. Non-limiting examples include acrylamides, acrylates, and combinations thereof. Other polymerizable binders could also be used. The binders should be capable of gasifying or oxidizing when heated. In the case of an alumina-containing article, the polymerizable binder is preferably one which sterically fixes alumina particles in the green product. This avoids alumina concentration, and ensures that the aluminum continues to be continuously dispersed throughout the core, to allow uniform oxidation when the core is situated in an oxygen-containing environment.

Those skilled in the art are familiar with various other components used in these types of ceramic slurries. For example, initiators such as ammonium persulfate are often used, as well as various catalysts, such as tetramethylethylene-diamine. Cross-linking agents such as N,N'-methylenebisacrylamide are also typically employed.

The gel-casting slurries employed in this invention usually contain about 30% by volume to about 70% by volume water and organic components (including organic solvents, binders, initiators, cross-linking agents, and the like). In preferred embodiments, the level of water and organic components is in the range of about 35% by volume to about 60% by volume. Substantially all of the remaining volume of the slurry comprises the ceramic component or components, e.g., about 40% by volume to about 65% by volume. The level of water in this water/organic portion itself is usually at least about 50% by volume, and often, at least about 65% by volume.

Another aspect of this invention relates to a method for fabricating a ceramic article. The method comprises the following steps:

(i) preparing a ceramic slurry which comprises
  (A) silica or a mixture of alumina and aluminum, and
  (B) a solution of a polymerizable binder in a liquid;
(ii) forming the slurry into a green product of an article-shaped body;
(iii) freezing the green product;
(iv) subjecting the frozen product to a vacuum for a sufficient time to freeze-dry the product; and
(v) heating the green product in an oxygen-containing atmosphere to form a sintered ceramic article.

Those skilled in the art are familiar with techniques for efficiently heating the green product in step (v). The heating temperature will depend on various factors, such as the identity of the particular components used to form the green product. Usually, temperatures in the range of about 300° C. to about 1350° C. are employed. The temperature should be sufficient to permit oxidation of the aluminum within the green product, as generally described in application Ser. No. 09/224,164. (The green product preferably contains open porosity, which allows oxygen to permeate its interior, thereby facilitating the oxidation). application Ser. No. 09/224,164 describes various heating regimens which are suitable for this embodiment of the present invention.

Various types of articles can be made by this method. For example, the article can be in the form of a core used in the investment casting of directionally solidified eutectic and superalloy materials. Information related to investment casting, cores, and ceramic shell molds is widely available. Exemplary sources of useful information are as follows: *Kirk-Othmer Encyclopedia of Chemical Technology*, 3rd Edition, Vol. 7, p. 798 et seq.; *Modern Metalworking*, by J. R. Walker, The Goodheart-Willcox Co., Inc., 1965; and *Shell Molding and Shell Mold Castings*, by T. C. Du Mond, Reinhold Publishing Corp., 1954. Another aspect of this invention is directed to a metal- or metal alloy component which is cast in a shell mold fabricated with at least one ceramic core prepared as described herein.

The following examples are merely illustrative, and should not be construed to be any sort of limitation on the scope of the claimed invention.

EXAMPLE 1

A gel-casting slurry was prepared by mixing the ingredients described below. The slurry contained 49% solids by volume, and 51% liquid by volume. The liquid portion contained about 39 volume % water; about 9.7 volume % hydroxymethyl-acrylamide (HMAM) as the binder (in the form of a 20 wt % solution in distilled water); about 2 volume % of Darvan® as a deflocculant (Darvan® is an ammonium polyacrylate-based compound in an aqueous solution, available from R.T. Vanderbilt Co.); and about 0.4 volume % glycerin as a plasticizer. The solid portion contained fused alumina (33.6 volume %), ranging in size from 120 mesh to 900 mesh, and aluminum metal (4 micron particle size). The weight ratio of fused alumina to aluminum metal was 4.5:1.

Sample A was a rod, 20 in. (51 cm) in length and 0.75 in. (1.9 cm) in diameter, which was cast and gelled from the slurry, as described in the above-referenced application Ser. No. 09/224,164. The gelled part was placed in a 75% relative humidity chamber, and allowed to dry for about 15 hours. Approximately 2.5% by weight of the water was removed during this drying step.

The rod was then frozen in a freeze dryer for about 12 hours, and the remainder of the water was removed during this step. The temperature in the freeze-dryer was initially increased from −30° C. to about 50° C., at a rate of about 2–6 degrees Centigrade per hour. The rod was then removed from the freeze dryer and examined. The rod was straight, with no discernible warpage or distortion. It also had excellent handling strength.

Sample B was a second rod gel-cast according to the procedure used for Sample A, with identical dimensions. The treatment process for this rod was outside the scope of this invention, i.e., there was no freeze-drying step. The gelled rod was placed in the 75% relative humidity chamber, and allowed to dry for about 15 hours. The rod was then placed in a 50% relative humidity chamber, and the drying was continued. Within 4 hours, one end of the bar had lifted about 0.25 in. (0.64 cm) from the surface upon which it rested. The bar was no longer straight. Drying was continued for another 48 hours. The bar was then heated in an oven at 50° C. for final drying. (Total drying time in the process was about 96 hours). The bar remained bent.

EXAMPLE 2

This example was a designed experiment, involving samples C and D. These samples generally correspond to samples A and B in Example 1. In other words, sample C was freeze-dried according to this invention, while sample D was not freeze-dried, but was dried in the relative humidity chamber. 120 test bars were used, each having dimensions of 5 cm in length, 12 mm in width, and 4–5 mm in thickness. The bars were prepared by a gel-casting slurry process similar to that described in Example 1. Several variables were present in equal numbers of samples from each set: (1) The amount of solids (i.e., aluminum and alumina) was varied from 46% by volume to 49% by volume; and (2) The heating rate during sintering was also varied, from 0.5° C. to 2° C. per minute.

The samples were evaluated for dimensional change (shrinkage) after being dried according to the respective techniques. The resulting data are depicted in FIG. 1. In the figure, the y-axis is based on the actual standard deviation in bar length for the samples. Sample C on the x-axis corresponds to shrinkage values for samples dried according to the present invention, i.e., freeze-drying. Sample D on the x-axis corresponds to the shrinkage values for samples dried according to the prior art. The error bars represent 95% confidence limits.

The data in FIG. 1 demonstrate that drying the ceramic articles according to the present invention considerably improves shrinkage reproducibility. This improvement is very important in many commercial venues. For example dimensional-reproducibility is highly desirable in large scale-casting operations, and is difficult to achieve when the casting includes varying wall thicknesses and/or intricate interior passageways. The increase in reproducibility obtained with this invention can enhance casting yields on a commercial production line.

EXAMPLE 3

The following example is a description of an exemplary method for preparing a green article from a ceramic slurry. A solution containing 20 wt % of N-Hydroxymethyl-acrylamide (HMAM) and 2 wt % of NTC-80 (a microcrystalline cellulose) in water was prepared. This solution was added to 500 g of 0.75 in. (1.9 cm)-diameter alumina balls in a 2 liter Nalgene mill jar. Darvan® (12.5 g), glycerin (8.79 g), and an aqueous solution of 2 wt % MEHQ (0.5 ml) were also added to the mill jar. Fused alumina and Al metal were added to the mixture in the jar, in the following quantities:

| Fused Alumina | Weight |
|---|---|
| 120 mesh alumina | 240.00 g |
| 240 mesh alumina | 360.00 g |
| 400 mesh alumina | 240.00 g |
| 900 mesh alumina | 60.00 g |
| Aluminum metal (4 micron) | 100.00 g |

The resulting slurry was thoroughly mixed by ball milling, for about 2 hours. After mixing, the slurry was poured from the mill jar into another container and weighed. The slurry was then placed in a vacuum and brought to a low-pressure boil to remove any entrained or trapped air (i.e. de-aired). Time under the vacuum was about 5 minutes. While stirring the de-aired slurry, 0.01 ml of TEMED (N,N,N,N'-tetramethylene diamine)/100 g of slurry was added. Next, while stirring, 0.2 ml of 10% solution of APS (ammonium persulfate) per 100 grams of slurry was added to the slurry, followed by more stirring. The slurry was again de-aired for 5 minutes. The slurry was then poured into a die. (In some runs, the slurry was injected into the die). The slurry-containing die was then placed in a 50° C. oven for ½ hour to convert the slurry into a cross-linked gel. The green part was then ready for drying according to the present invention.

The example was repeated, using 14-micron aluminum metal, rather than 4-micron aluminum metal.

Having described preferred embodiments of the present invention, alternative embodiments may become apparent to those skilled in the art without departing from the spirit of this invention. Accordingly, it is understood that the scope of this invention is to be limited only by the appended claims.

All of the patents, articles, and texts mentioned above are incorporated herein by reference.

What is claimed:

1. A method for fabricating a gel-cast ceramic article suitable for use as a core in the investment casting of directionally solidified eutectic and superalloy materials, the method comprising the steps of:

(i) preparing a ceramic slurry which comprises:
　(A) a ceramic component, and
　(B) a solution of a polymerizable binder in a liquid;
(ii) forming the slurry into a gel-cast green product of an article-shaped body;
(iii) allowing the slurry to gel;
(iv) pre-drying the gel-cast green product under conditions of high humidity;
(v) freezing the gel-cast green product after pre-drying the gel-cast ceramic article;
(vi) subjecting the frozen product to a vacuum for a sufficient time to freeze-dry the product; and
(vii) heating the gel-cast green product in an oxygen-containing atmosphere to form a sintered ceramic article.

2. The method of claim 1, wherein the slurry comprises at least one material selected from the group consisting of alumina, alumina-aluminum, silica, zirconia, zircon, silica-zircon, silicon carbide, silicon nitride, magnesium oxide, and mixtures which include at least one of these components.

3. The method of claim 1, wherein the slurry comprises at least one material selected from the group consisting of alumina, aluminum-alumina, zircon, and mixtures which include at least one of these components.

4. The method of claim 1, wherein the slurry includes water.

5. The method of claim 4, wherein the polymerizable binder is selected from the group consisting of acrylates, acrylamide-based monomers, and combinations thereof.

6. The method of claim 4, wherein the gel-casting slurry further comprises at least one component selected from the group consisting of a deflocculant and a plasticizer.

7. The method of claim 1, wherein the article is a ceramic core.

8. The method of claim 7, wherein the ceramic core is formed from at least one material selected from the group consisting of silica, alumina, aluminum-alumina, zircon, and mixtures which include at least one of these components.

9. The method of claim 1, wherein the temperature of the ceramic article is gradually increased during step (iv), from a freezing temperature to a temperature of at least about 20° C.

10. The method of claim 1, wherein the ceramic component is a mixture of alumina and aluminum having a weight ratio of alumina to aluminum within the slurry within the range of about 20:1 to about 5:2.

11. The method of claim 1, wherein the alumina is fused alumina.

* * * * *